(12) United States Patent
Hörber

(10) Patent No.: US 6,411,221 B2
(45) Date of Patent: *Jun. 25, 2002

(54) DEVICE AND METHOD TO DETECT AN OBJECT IN A GIVEN AREA, ESPECIALLY VEHICLES, FOR THE PURPOSE OF TRAFFIC CONTROL

(76) Inventor: Ernst Hörber, Zuckmantelstrasse 3, D-91616 Neusitz (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,444

(22) Filed: Aug. 26, 1999

Related U.S. Application Data

(63) Continuation of application No. PCT/EP98/01102, filed on Feb. 26, 1998.

(30) Foreign Application Priority Data

Feb. 27, 1997 (DE) ......................................... 197 08 014

(51) Int. Cl.[7] ................................................. G08G 1/01
(52) U.S. Cl. ....................... 340/933; 340/942; 340/943; 701/117
(58) Field of Search ................................. 340/907, 933, 340/934, 935, 936, 942; 701/117, 118

(56) References Cited

U.S. PATENT DOCUMENTS

| | | | | |
|---|---|---|---|---|
| 3,290,489 A | * | 12/1966 | Auer, Jr. ..................... | 340/933 |
| 3,532,886 A | * | 10/1970 | Kruger, Jr. et al. ......... | 340/933 |
| 3,872,283 A | | 3/1975 | Smith et al. ............. | 235/150.2 |
| 5,321,490 A | | 6/1994 | Olson et al. .................... | 356/5 |
| 5,546,188 A | * | 8/1996 | Wangler et al. ............. | 356/376 |
| 5,708,425 A | * | 1/1998 | Dwyer et al. ................ | 340/928 |
| 5,995,900 A | * | 11/1999 | Hsiao et al. | |

FOREIGN PATENT DOCUMENTS

| | | | |
|---|---|---|---|
| DE | 89 12 983 U1 | 3/1990 | .......... G01S/13/04 |
| DE | 40 41 149 C1 | 3/1992 | .......... G08G/1/015 |
| DE | 42 34 880 A1 | 4/1994 | .......... G08G/1/015 |
| DE | 4421140 A1 | 1/1995 | ............ G01C/3/08 |
| DE | 4304298 A1 | 8/1995 | .......... G08G/1/015 |
| DE | 4411994 A1 | 11/1995 | ............. G06T/7/20 |
| EP | 0 674 184 A1 | 9/1995 | .......... G01S/13/91 |

OTHER PUBLICATIONS

International Search Report dated Jul. 14, 1998, PCT/EP98/01102 (3 pages).

Patent Abstracts of Japan, vol. 096, Sep. 30, 1996 and JP 08124081 A, published May 17, 1996, Abstract: "Vehicle Detector".

Tarik Hussain et al.: "Overhead Infrared Vehicle Sensor for Traffic Control", Personal Communication–Freedom Through Wireless Technology, Secaucus, NJ, Conf. 43, IEEE, pp. 351–355, May 18, 1993.

* cited by examiner

Primary Examiner—Julie Lieu
(74) Attorney, Agent, or Firm—Fitch, Even, Tabin & Flannery

(57) ABSTRACT

When detecting an object in a given area, especially vehicles for the purposes of traffic control, there appear to be inaccuracies in the system based on measuring pulse propagation times. In order to avoid such inaccuracies, a sample of observed (measured) real values is compared with a gauging table having a sample of values stored therein, so that pulse propagation time measurements are no longer necessary.

21 Claims, 3 Drawing Sheets

Figure 1:
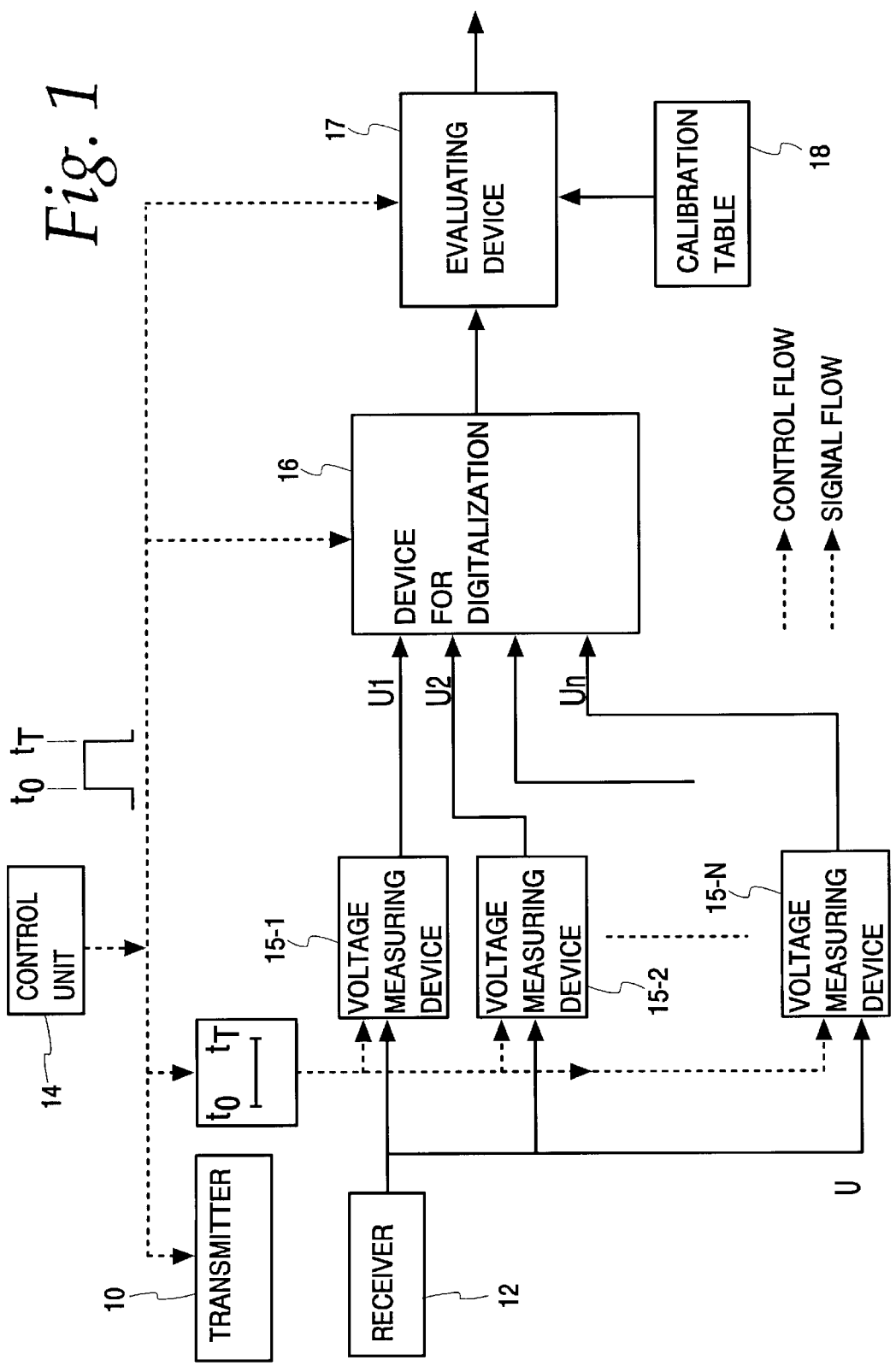

DEVICE AND METHOD TO DETECT AN OBJECT IN A GIVEN AREA, ESPECIALLY VEHICLES, FOR THE PURPOSE OF TRAFFIC CONTROL

This application is a continuation of prior International application No. PCT/EP98/0110, filed Feb. 26, 1998, and designating the United States, which claims priority to German Application No. 197 08 014.6, filed Feb. 27, 1997.

The present invention concerns an apparatus and a method for detecting an object in a predetermined spatial region, in particular vehicles for traffic monitoring, according to the introductory part of the claims.

An apparatus of this kind is known from DE 42 34 880. The apparatus for detecting and recognising vehicles located on a roadway includes two narrowly focused distance sensors in order to be able to determine direction of travel, speed and vehicle length at the same time. By measuring the vehicle height which is determined from the measured, different distance values, classification of the vehicle model is possible. In this case the distance sensors are spaced apart in the direction of travel by a distance which is substantially shorter than the length of the vehicle. Also distance sensors have the advantage over ordinary reflex light barriers that higher reliability and better detection behaviour are achieved, as inaccuracies on account of distinguishing between beams which are reflected by a moving vehicle or by the road are reduced. To determine the speed, length and direction of travel of the vehicle, a pulse run time measurement is performed. A time measuring device for this purpose measures the time which elapses between detection of the vehicle by the first and second sensors.

From U.S. Pat. No. 5,321,490 is known an electronic object sensor for detecting objects which are in the vicinity of the sensor. Two focused, pulse-like laser beams diverging from each other are directed onto the area to be examined. The two beams are generated by means of a prism from a single laser beam emitted by a laser diode. The object sensor includes a receiver for detecting the beams reflected by an object in the area of observation. The run time which a pulse-like beam emitted by the transmitter needs until detection by the receiver is measured. The speed of an object in the area of observation is calculated from the distance which the two laser beams describe on the road surface, and the time which elapses between detection of the vehicle by the first beam and detection by the second beam.

From the reception of several successive pulses it is possible to deduce the number of vehicles, the vehicle size and shape, and hence the vehicle model.

A difficulty with the known systems however exists with respect to greatly fluctuating signal amplitudes which arise on account of the different reflection properties of the surfaces by which the light is reflected (e.g. road surface, plastic parts, windscreen or black metal parts). This means that surfaces the same distance away cause reception signals with essentially the same run time but different signal amplitude, which leads to difficulties in determining and fixing the moment of reception of the reflected signal. This causes in general uncertainty in time measurement of entry of the object into the laser beam, and therefore needs special precautions, for example an additional detector, in order to be able to correct this error.

It is the problem of the present invention, in detecting an object in a predetermined spatial region, in particular vehicles for traffic monitoring, to avoid the inaccuracies arising in case of run time measurements.

This problem is solved according to the invention.

A central concept consists in that detection of the object in a given region takes place by a comparison of an observed (measured) instantaneous value pattern with a previously determined instantaneous value pattern stored in a calibration table.

The advantages gained with the invention lie in particular in that a distance measurement can be determined by detecting a single backscattered or reflected radiation pulse without a timekeeper being needed. With the invention, measurement of the run time of a radiated pulse is completely avoided.

In traffic monitoring, traffic parameters such as for example number of vehicles, direction of travel and distance between the vehicles as well as vehicle speed, model, height and length can be detected. Also the invention advantageously allows detection of stationary vehicles within any selected time interval. By detecting several successive backscattered and reflected pulses it is possible to determine a profile of a vehicle. By a comparison with different patterns or characteristic features stored in a microprocessor unit, vehicle models can be recognised.

Another advantage of the invention lies in that the apparatus can be used in all weather situations, owing to the wavelength of the transmitter used. In addition the apparatus constitutes a component which is precise, reliable and cheap and requires only little maintenance.

By arranging three pairs of aligned laser diodes, of which the central pair is arranged in such a way that the radiation is directed perpendicularly relative to the area of observation, and the pairs to the left and right of the central pair are inclined by about $\pm 12°$, detection of the whole roadway can be achieved. In this case the apparatus is oriented vertically to the road surface. However, the apparatus can be mounted horizontally and mobile in vehicles. For the detection of traffic data of a multi-lane roadway, a plurality of sensor apparatuses can be run in parallel. Such an embodiment of the invention can similarly be used for traffic control.

However, the application of the principle according to the invention is not confined to the monitoring of traffic. Another application of the invention is for example the security monitoring of rooms.

Figure 2:
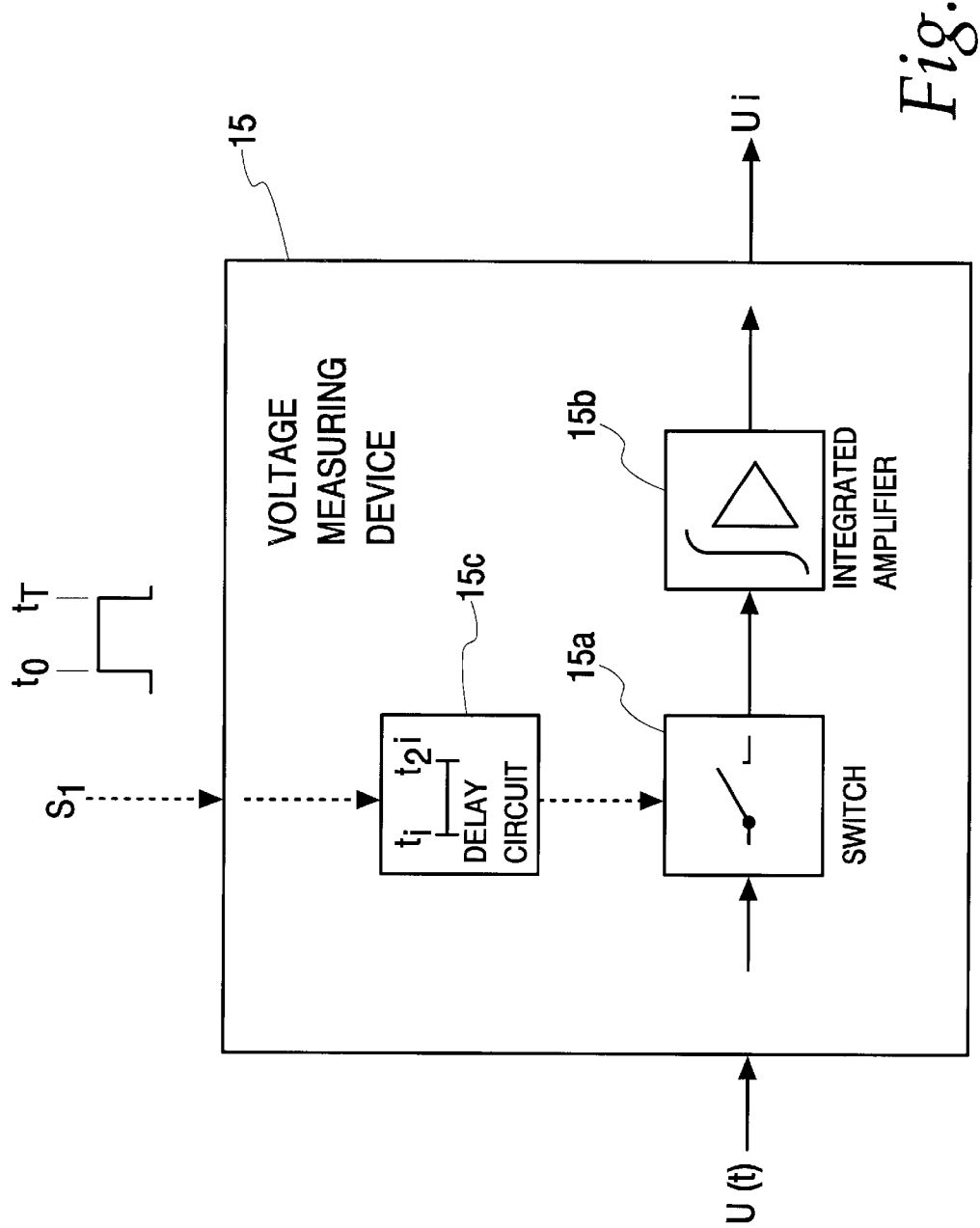

A detailed description of the apparatus according to the invention and the method according to the invention is given below with the aid of the drawings, showing:

FIG. 1 a schematic view of an embodiment of the invention;

FIG. 2 a schematic view of a device for detecting instantaneous values; and

Figure 3:
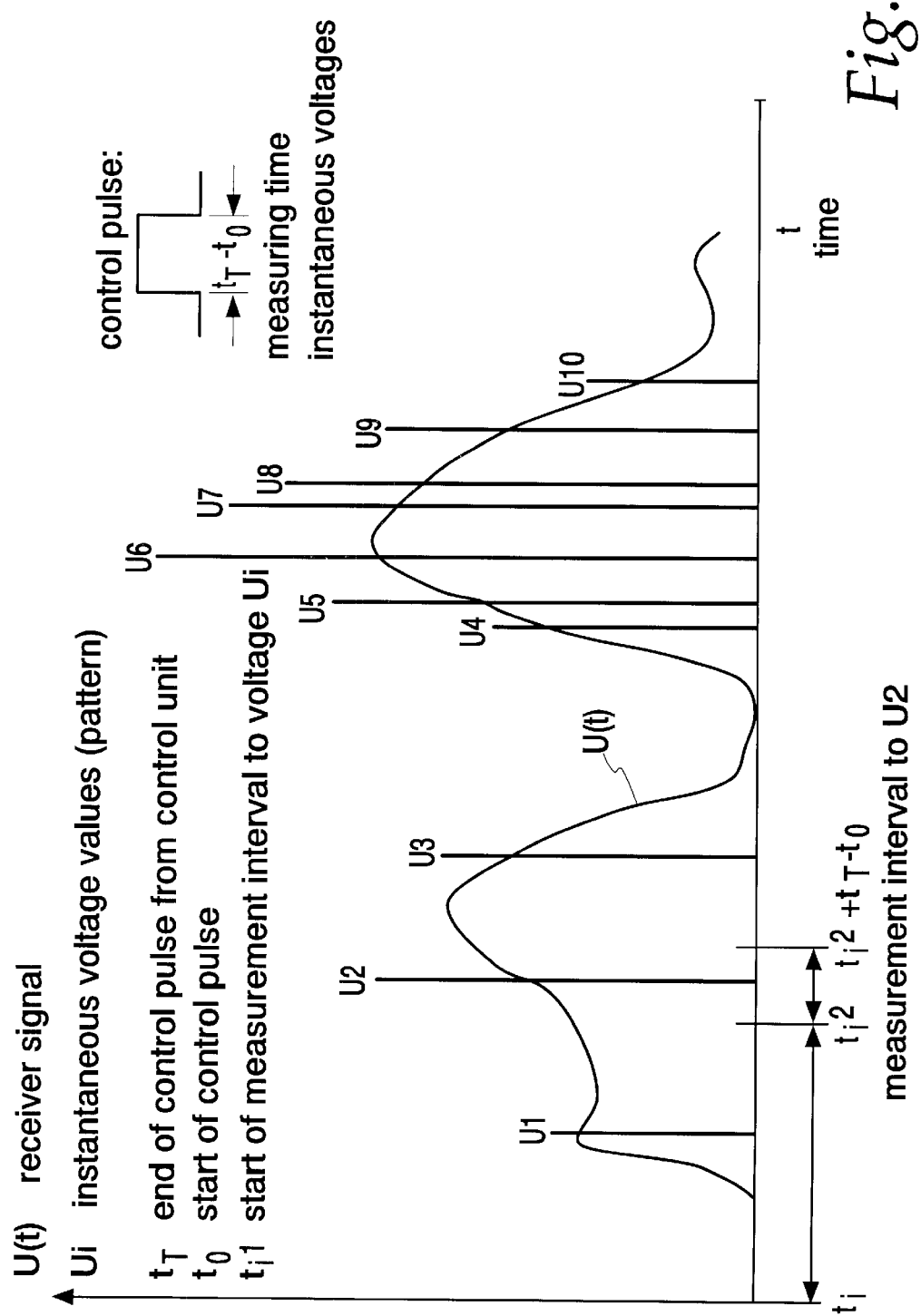

FIG. 3 a time-dependent detection signal which the receiver delivers on account of the radiation backscattered or reflected from the monitored spatial region.

The embodiment of an apparatus according to the invention shown schematically in FIG. 1 includes a transmitter 10 which emits a pulse-like energy beam in the direction of a region to be monitored, for example above a road. The transmitter 10 is preferably a laser diode whose light has a wavelength in the near infrared range of typically 860 nm. By using a laser diode of class 1, danger to the human eye is excluded, and by the selected wavelength it is ensured that the radiation emitted is hardly impaired by external factors such as for example poor sight or darkness. The output power of the laser diode is typically 200 $\mu$W.

When used for traffic monitoring, the transmitter 10 is preferably mounted in such a way above the roadway to be monitored (not shown) that the radiation is emitted vertically in the direction of the roadway.

The emission of laser pulses by the transmitter 10 is controlled by a control unit 14 by the control unit 14 emitting a control signal to the transmitter 10, which triggers the laser pulse by its ascending flank. In practice, the laser pulses generated have a repetition rate of 30 kHz. The full width at half-maximum of an individual pulse is typically 15 ns.

The laser beam is influenced, for example focused, by a lens (not shown) mounted in front of the transmitter so that a pulsed beam of suitable geometry is available for the observation of vehicles in road traffic. In this connection it should be mentioned that for the detection or recognition of objects in the space, for example caused by a moving person, a beam of high divergence with preferably a quasi-isotropic radiation characteristic is used to ensure three-dimensional detection.

As already mentioned before, the pulsed beam is radiated into a region of observation in which an object is located. The radiation backscattered or reflected by this object is detected by the receiver 12. The receiver 12 then delivers, for each individually received pulse, a time-dependent detection signal U(t). The control signal with which emission of the pulse is triggered in the transmitter is fed to at least two devices 15-1, 15-2, ..., 15-n for the detection of instantaneous values of the detection signal U(t). Preferably the control signal is delayed for a predetermined length of time, so that the detection of instantaneous values does not begin until the reflected pulse actually reaches the receiver. In FIG. 1 the control pulse emitted by the control unit 14 is shown with a pulse duration $t_T-t_0$. In this case $t_0$ denotes the start of the control pulse and $t_T$ the end of the control pulse. $t_i$ denotes the beginning of a corresponding measurement interval, which will be described in more detail below.

The detection signal U(t) is fed to the devices 15-1, 15-2, ..., 15-n for the detection of instantaneous values of the detection signal U(t), which in the embodiment described here are instantaneous voltage measuring devices 15-1, 15-2, ..., 15-n for the measurement of instantaneous voltages in corresponding time intervals. The measurement intervals are stipulated by the control unit 14 and are such that, for reasons of sensitivity, the width of the intervals does not substantially exceed the pulse width of the received reflected pulse. The intervals can have different widths and overlap in time. They should however completely cover the whole time range in order to avoid "blind" distance zones. The number of measurement intervals can be optimised according to the required precision of measurement, but every received pulse must be capable of detection in at least two measurement intervals offset from each other in time.

As can be seen in FIG. 2, each instantaneous voltage measuring device 15 includes a switch 15a open in the untriggered state and an integrating amplifier 15b for measuring an instantaneous voltage Ui of the detection signal U(t) within a given range of measuring times. The control pulse from the control unit 14 is fed via a delay circuit 15c to the switch 15a, with the result that the control pulse from the control unit 14 after a given delay closes the switch 15a of the instantaneous voltage measuring device 15 for a predetermined time interval. In the process, closing of the switches 15a of the different instantaneous voltage measuring devices 15-1, 15-2, ..., 15-n is offset from each other in time, so that the whole measurement range in which the backscattered or reflected radiation can be received is completely covered. Thus each instantaneous voltage measuring device 15-1, 15-2, ..., 15-n delivers an instantaneous voltage value U1, U2, ..., Un of the detection signal U(t), as shown in FIG. 3 for ten different instantaneous voltage values (U1–U10). In this way a set of instantaneous voltage values is obtained according to the invention from the time-dependent detection signal U(t). It should be mentioned that the instantaneous voltage value $U_i$ can be the voltage integral over the interval i, or the voltage at the end of the interval, or some other value characteristic of the interval. In general a set of n instantaneous voltage values U1, U2, ..., Un is produced for each pulse detected by the receiver.

The instantaneous voltage values U1, U2, ..., Un are then in the embodiment shown in FIG. 1 transmitted to a device 16 for digitalisation which includes a multiplexer and an analogue-to-digital converter (not shown). Evaluation then takes place in an evaluating device 17 to which the digitalised values are fed and which advantageously includes a microprocessor by means of which the digitalised values are processed.

In a preferred embodiment a set of quotients of adjacent instantaneous voltage values $U_i/U_{i+1}$ is calculated from the instantaneous voltage values obtained from each measurement pulse. In this way a quotient pattern (or instantaneous voltage pattern) is determined for each measurement pulse radiated by the transmitter 10. By a subsequent comparison of the instantaneous voltage pattern with experimentally determined instantaneous voltage patterns which are stored in a calibration table 18 connected to the evaluating device 17, the distance between an object located in the region of observation and the measuring device can be determined directly. For the application within the scope of traffic monitoring, this means: If the distance determined differs from the constant distance between measuring device and road, in this way the presence of a vehicle in the monitored spatial region is detected.

For an object moving in the area of observation, the profile of the object which is characteristic of the moving object can be determined from the detection of successively radiated pulses received by the receiver device, on the basis of the distance varying from one pulse to the next. For instance, in case of traffic monitoring, a profile of moving vehicles can thus be determined and the vehicle model classified in addition.

By arranging a second measuring device of identical construction, which is arranged at a distance from the first measuring device in the direction of movement of the object, the speed of a moving object can be determined. Each of the measuring devices emits a focused pulse-like laser beam in the direction of the region of observation. A moving object is then recorded by the first measuring device as described above, and then an instantaneous voltage pattern is formed. By the reception of successive radiation pulses a profile of the moving object is thus determined, as discussed before. On account of the movement of the object, the latter is also detected by the second measuring device and a further profile of the moving object is determined. Next the time which elapses between recording of the object by the first measuring device and by the second measuring device can be determined. By means of the measured elapsed time, the speed of the object can be determined.

What is claimed is:

1. Apparatus for detecting an object in a predetermined spatial region, in particular vehicles for traffic monitoring, by comparing measured value pattern with a predetermined stored value patterns, including a transmitter for generating and emitting radiation pulses to the predetermined spatial region, a receiver to receive radiation backscattered or reflected from the predetermined spatial region and to emit a time-dependent detection signal (U(t)) for each individually received backscattered or reflected radiation pulse, at least two measuring devices, each of which to measure an instantaneous values U(i) of the detection signal U(t) within a corresponding measurement time interval, the intervals of the measuring devices being offset from each other in time, a control unit to provide a control signal to the transmitter to trigger the emission of a radiation pulse, and to the measuring devices to measure the instantaneous values of the time-dependent detection signal in the corresponding measurement time intervals, which are stipulated by the control unit, and a comparing unit compare a value pattern derived from the measured instantaneous values of the detection signal, with stored predetermined value patterns.

2. Apparatus according to claim 1, wherein the detection signal U(t) is fed in parallel to the at least two measuring devices.

3. Apparatus according to claim 1, wherein the measuring devices are instantaneous voltage measuring devices.

4. Apparatus according to claim 3, wherein each measuring device includes a switch which is open in the untriggered state and which is operated by the control signal from the control unit, and an integrating amplifier to which the detection signal U(t) is fed when the switch is closed.

5. Apparatus according to claim 1, including the comparing unit comprises a digitalization device for digitization of the measured instantaneous values and the detection signal, and an evaluating device for deriving a value pattern from the measured instantaneous values and for comparing the value pattern with predetermined stored value patterns.

6. Apparatus according to claim 5, wherein the stored value patterns are filed in a calibration table.

7. Apparatus according to claim 6, wherein the value patterns filed in the calibration table are assigned to given distances.

8. Apparatus according to claim 1, wherein the radiation pulse radiated by the transmitter is narrowly focused for a distance measurement or wherein the radiation pulse radiated by the transmitter is fanned out for space monitoring.

9. Apparatus according to claim 1, wherein the radiation pulse is a laser light pulse, preferably with a wavelength of about 860 nm.

10. Apparatus according to claim 9, wherein the full width at half-maximum of the pulse is about 15 ns.

11. Apparatus according to claim 9, wherein the repetition rate of the pulse is about 30 kHz.

12. Method for detecting an object in a predetermined spatial region, in particular vehicles for traffic monitoring, by comparing measured value pattern with a predetermined stored value patterns, with the steps of:

emitting at least one radiation pulse to the predetermined spatial region, receiving radiation backscattered or reflected from the predetermined spatial region, generating a time-dependent detection signal for each individually received radiation pulse, measuring instantaneous values of the detection signal within at least two measurement time intervals, being offset from each other in time, deriving a measured value pattern from the measured instantaneous values of the detection signal, and compare the measured value pattern with predetermined stored value patterns.

13. Method according to claim 12, wherein the comparison of the value pattern is carried out with the aid of value patterns stored in a calibration table.

14. Method according to claim 13, wherein the comparison leads to a distance filed in the calibration table as the result.

15. Method according to claim 12, wherein the measurement time intervals almost completely cover a predetermined measurement time range in which the backscattered or reflected radiation is received.

16. Method according to claim 12, wherein the width of a measurement time interval does not exceed the pulse width of the received backscattered or reflected radiation.

17. Method according to claim 12, wherein each received pulse is capable of detection in at least two measurement intervals offset from each other in time.

18. Method according to claim 12, wherein the instantaneous values are instantaneous voltage values.

19. Method according to claim 12, wherein the radiation pulse is a laser light pulse, preferably with a wavelength of about 860 nm.

20. Method according to claim 19, wherein the full width at half-maximum of the pulse is about 15 ns.

21. Method according to claim 19, wherein the repetition rate of the pulse is about 30 kHz.

* * * * *